United States Patent [19]
Hong

[11] Patent Number: 5,503,240
[45] Date of Patent: Apr. 2, 1996

[54] POWER STEERING DEVICE FOR AN AUTOMOBILE

[76] Inventor: Soon-Young Hong, 456-15 Hoewon-Dong, Hoewon-Ku, Masan, Kyung Nam, Rep. of Korea

[21] Appl. No.: 182,399

[22] Filed: Jan. 18, 1994

[30] Foreign Application Priority Data

Sep. 20, 1993 [KR] Rep. of Korea ............... 93-18986

[51] Int. Cl.⁶ .................................................. B62D 5/04
[52] U.S. Cl. ................................................... 180/79.1
[58] Field of Search .................... 180/79.1, 79.3, 180/79, 150, 146; 318/372, 371, 488, 489

[56] References Cited

U.S. PATENT DOCUMENTS

| | | | |
|---|---|---|---|
| 2,775,132 | 12/1956 | Orr et al. | 180/79.1 X |
| 2,806,101 | 9/1957 | Gandes | 180/79.1 X |
| 2,877,656 | 3/1959 | Orr | 180/79.1 X |
| 2,930,247 | 3/1960 | Zinn | 180/79.1 |
| 3,426,863 | 2/1969 | Hansen | 180/79.1 X |
| 3,983,953 | 10/1976 | Bayle | 180/79.1 |
| 4,022,301 | 5/1977 | Hansen | 318/372 X |
| 4,703,821 | 11/1987 | Shimizu | 180/79.1 |
| 4,869,333 | 9/1989 | Morishita et al. | 180/79.1 |
| 4,871,039 | 10/1989 | Daido et al. | 180/79.1 |
| 4,913,249 | 4/1990 | Lang | 180/79.1 |
| 4,940,102 | 7/1990 | Morishita | 180/79.1 |
| 4,940,107 | 7/1990 | Hanisko | 180/79.1 X |
| 5,002,142 | 3/1991 | Klosterhaus | 180/79.1 |
| 5,010,970 | 4/1991 | Yamamoto | 180/79.1 |
| 5,226,498 | 7/1993 | Gutkowski et al. | 180/79.1 |
| 5,226,499 | 7/1993 | Kanazawa | 180/79.1 |
| 5,236,355 | 8/1993 | Takeuchi et al. | 180/79.1 |
| 5,238,076 | 8/1993 | Aznar et al. | 180/79.1 |
| 5,299,650 | 4/1994 | Wada et al. | 180/79.1 |
| 5,381,869 | 1/1995 | Norton | 180/79.1 |

FOREIGN PATENT DOCUMENTS

| | | | |
|---|---|---|---|
| 2942532 | 4/1981 | Germany | 180/79 |
| 0191269 | 8/1987 | Japan | 180/79 |

*Primary Examiner*—Margaret A. Focarino
*Assistant Examiner*—F. Zeender

[57] ABSTRACT

An electrical power steering device for an automobile is disclosed. The device has a steering motor, a transmitting mechanism having two transmitting portions rotating in opposite directions respectively, by the steering motor, a coupling for coupling one of the two transmitting portions to at least one of the steering shaft and the steering link, and a switching device applying a driving signal to the steering motor when the steering wheel rotates and applying a selective coupling signal to the coupling corresponding to the steering direction of the steering wheel.

14 Claims, 5 Drawing Sheets

F I G. 1
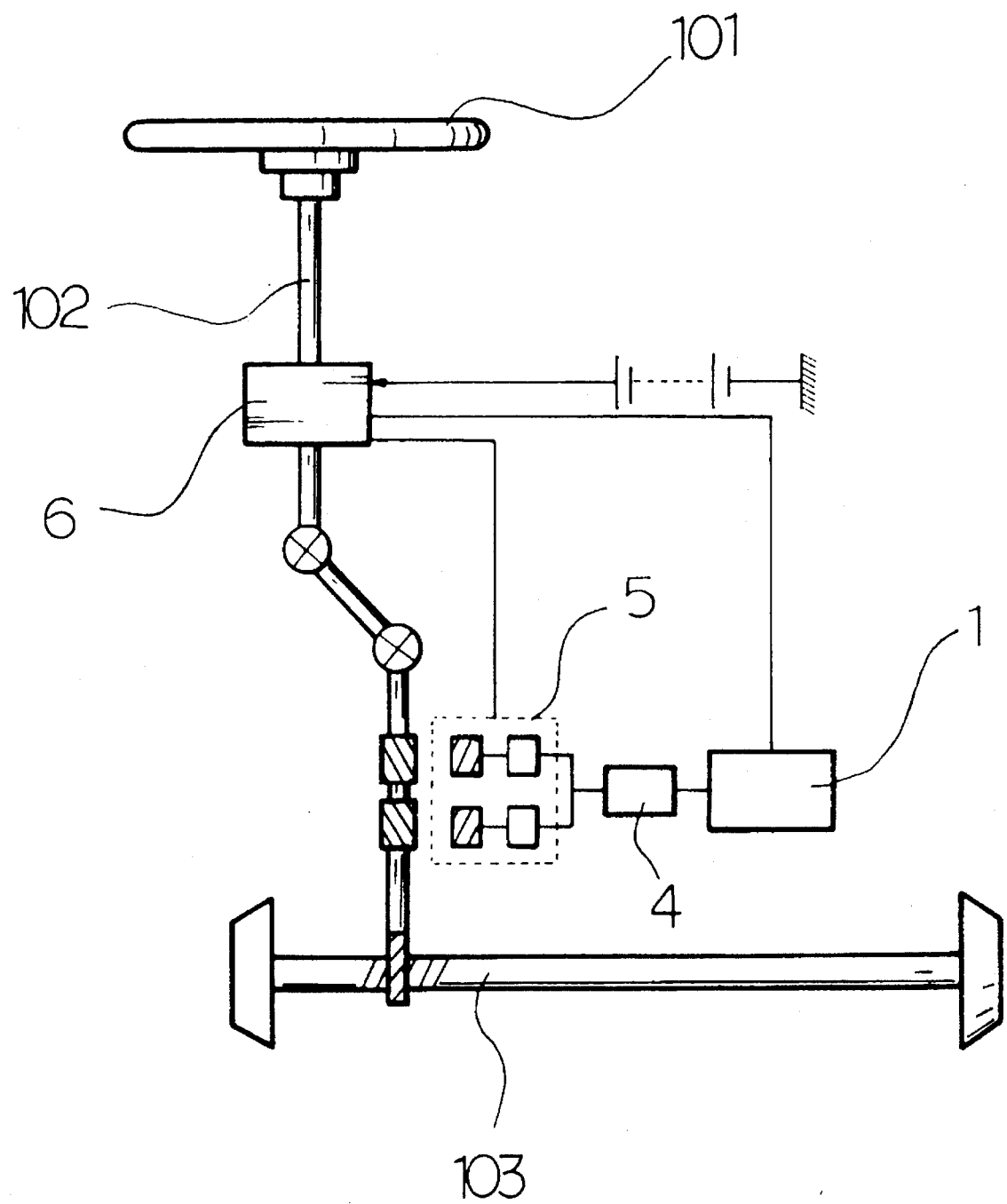

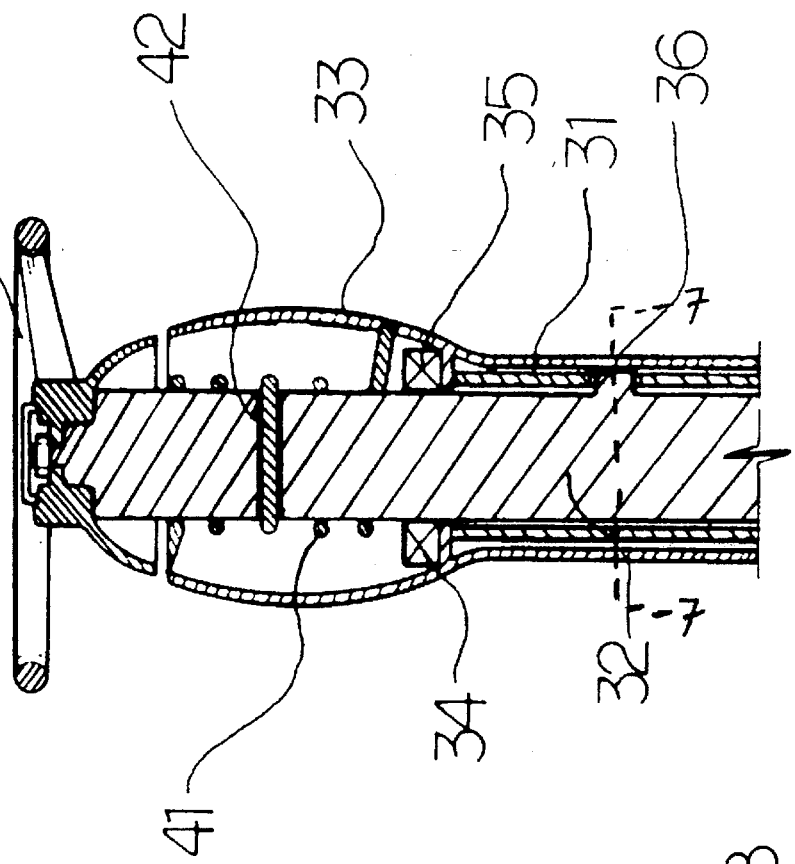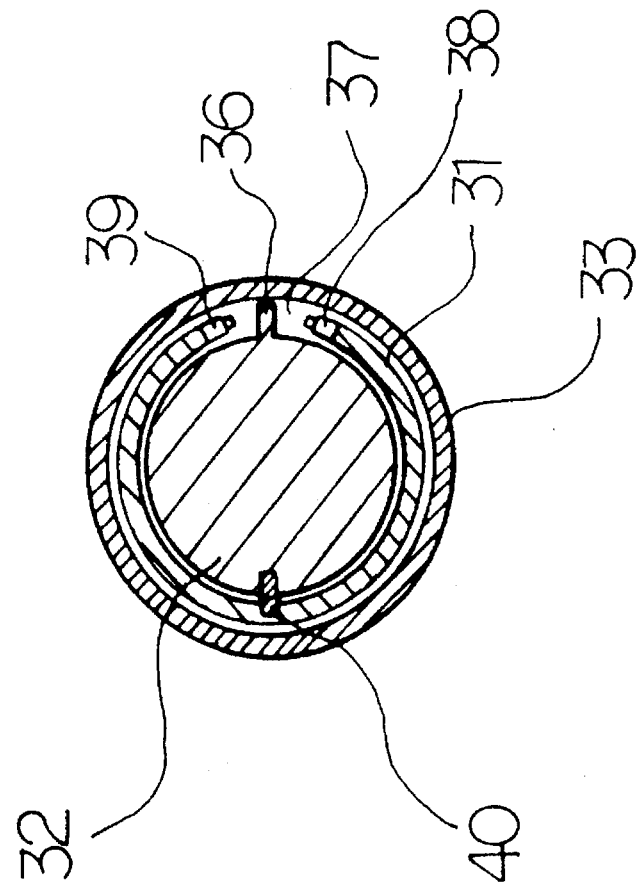

POWER STEERING DEVICE FOR AN AUTOMOBILE

FIELD OF THE INVENTION

The present invention relates to a power steering device for an automobile, and more particularly, to an electrical power steering device which has a steering motor connected to one of the steering link or the steering shaft, and switching means installed on one of the steering shaft or the steering wheel to apply driving signals to the steering motor.

BACKGROUND OF THE INVENTION

Conventional power steering devices for automobiles currently used are mainly oil-hydraulic types. These types of power steering devices have an oil pump as a hydraulic power unit, an oil-hydraulic actuator or converting oil pressure from the oil pump into mechanical strength to generate steering force, a control unit controlling operation of steering by opening or closing the passage between the oil pump and the actuator, and a number of additional components to ensure operational accuracy.

Therefore, these power steering devices require comparatively complicated mechanical structures, a large mounting space, an increase in weight, and high production costs. Furthermore, a regular replenishment of oil is required in order to maintain its best performance.

Consequently, various kinds of electrical power steering devices are known which replace the oil pump and the actuator by a steering motor. Japanese Patent Publication No. 83-202803 and No. 84-70257 disclose typical examples of these. These power steering devices generally have a steering motor connected to the steering link or to the steering shaft, a torque sensor detecting the torque of the steering wheel, a speed sensor detecting the running speed of a car, and a control unit changing the torque of the steering motor in accordance with the output from each sensor.

However, most of these electrical power steering devices have some fatal disadvantages. First of all, they have a high probability of malfunctioning such as, for example, unintended steering contrary to the driver's intentions, mostly due to the variation of voltage on the circuit, which is generated from the power source and/or the torque sensor. Secondly, they have a high probability of damage to the circuit due to the resistances used for changing the torque of the steering motor, and in case .of such damage, steering capability may be lost, bringing about extreme danger. Thirdly, they have structural difficulty in returning the steering wheel and the steering shaft to the straight direction when steering in a different direction is completed, because the steering motor rotates together with the steering wheel. Otherwise an additional circuit should be provided for this purpose.

Due to the drawbacks still unsolved, the electrical power steering devices have not been widely used in spite of their simple structure and light weight.

The inventor has disclosed an electrical power steering device in U.S. patent application Ser. No. 08/097,709 and 8/117,239. This electrical power steering device is believed to succeed in solving most of the problems described in the above, but a delay in steering response time occurred due to inertia rotation of the steering motor.

Accordingly, the inventor has studied how to acquire an immediate steering response in the electrical power steering device, and as a results, has found that this immediate steering response can be obtained by making the steering motor rotate in one direction at all times, and by changing the structure of transmission between the steering motor and the steering shaft.

SUMMARY OF THE INVENTION

Therefore, it is an essential object of the present invention to provide an electrical power steering device which is free of the above-mentioned drawbacks and has an immediate steering response.

It is another object of the present invention to provide an electrical power steering device which is capable of shifting its steering mode, that is, from a manual steering mode to a power steering mode in accordance of the driver's intentions or the travelling speed of the car.

According to the present invention, there is provided an electrical power steering device for an automobile, which comprises a steering motor, transmitting means having two transmitting portions rotating in opposite directions, respectively, by the steering motor, coupling means coupling one of the two transmitting portions to the steering shaft, and switching means applying a driving signal to the steering motor when the steering wheel rotates and a selective coupling signal to the coupling me arts corresponding to the steering direction of the steering wheel.

BRIEF DESCRIPTION OF THE DRAWINGS

Other objects and advantages of the present invention will become apparent from the following description when taken in conjunction with the accompanying drawings, in which:

FIG. 1 is a schematic view of the present invention.

FIG. 6 is a longitudinally sectioned view taken along line 6—6 of FIG. 5.

FIG. 7 is a sectioned view taken on 7—7 of FIG. 6.

DESCRIPTION OF THE PREFERRED EMBODIMENTS

Figure 2:
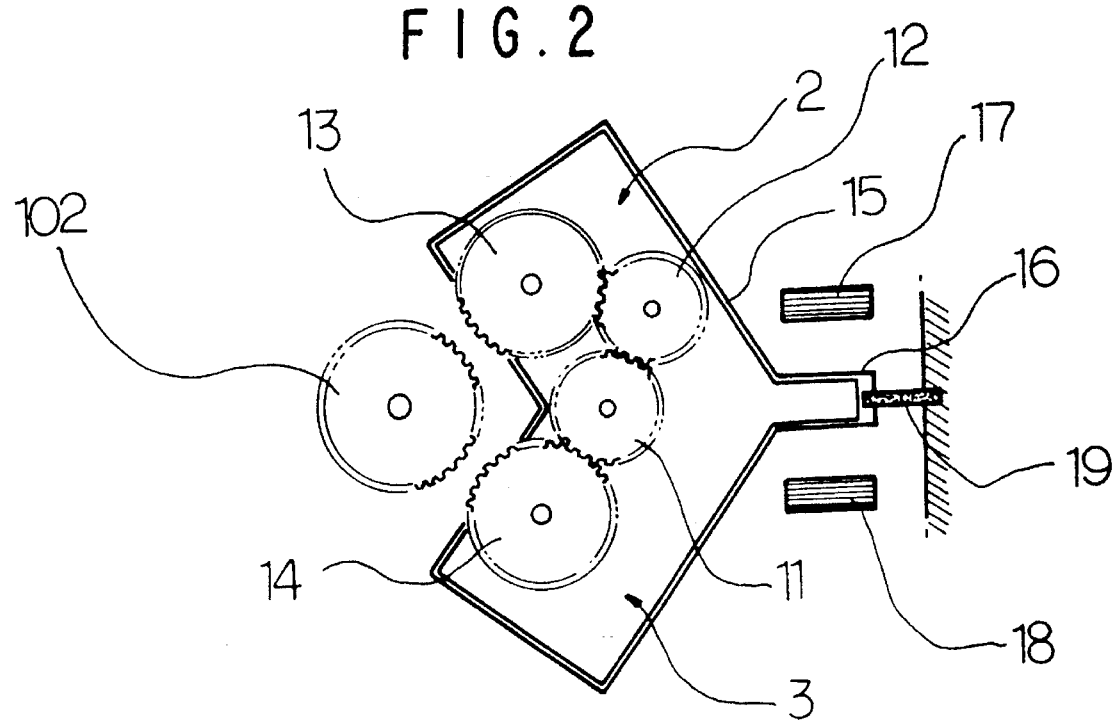
FIG. 2 to FIG. 4 are schematic views illustrating an embodiment of the transmitting means and coupling means according to the present invention.

Referring to FIG. 1 of the drawings, there is shown a power steering device according to the present invention. A steering wheel 101 is connected to a steering shaft 102, and the steering shaft 102 is connected to a steering link 103. In the present invention, there is provided a steering motor 1 driven to rotate when the steering wheel 101 rotates, transmitting means 4 having two transmitting portions 2, 3 rotating in the opposite direction respectively, by the steering motor 1, coupling means 5 coupling one of the two transmitting portions 2, 3 to the steering shaft 102, and switching means applying a driving signal to the steering motor 1 and a selective coupling signal to the coupling means 5 corresponding to the steering direction of the steering wheel 101.

Figure 3:
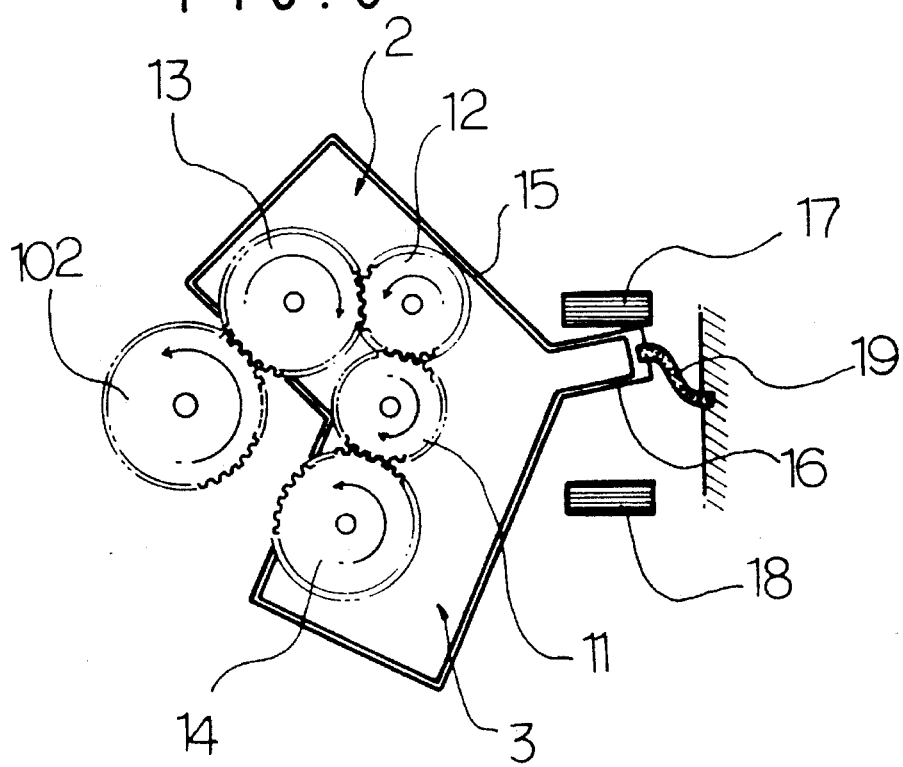
Figure 4:
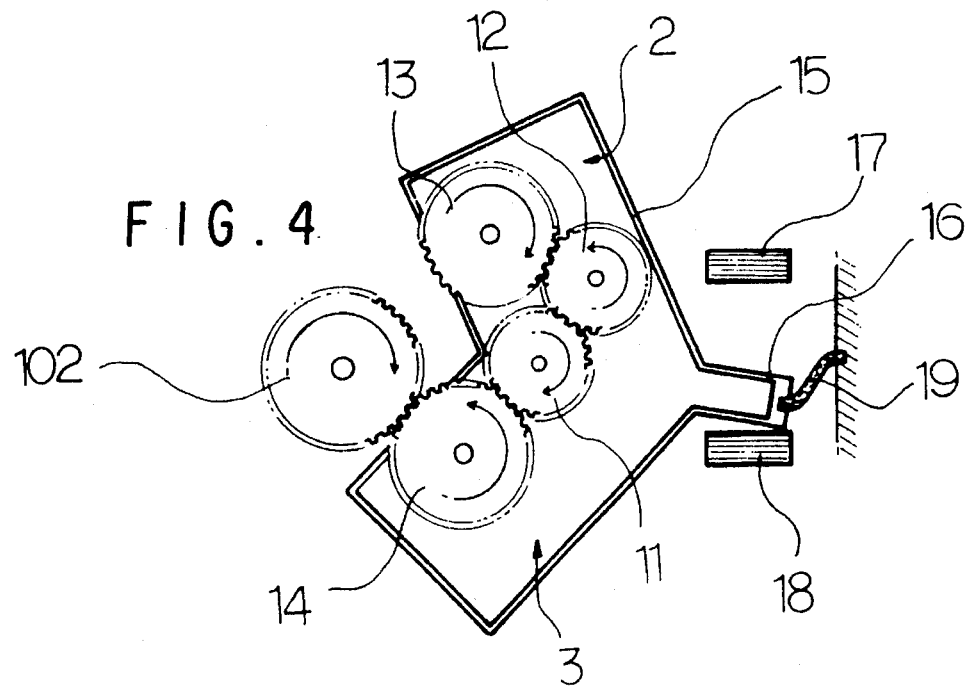

FIG. 2 to FIG. 4 show the first embodiment of the transmitting means and the coupling means according to the present invention.

The transmitting means have a driving gear 11 connected to the steering motor, and first and second transmitting portions 2, 3 rotating in the opposite direction, respectively, are driven so as to rotate by the driving gear 11.

Transmitting portion 2 has an even number of following gears 12, 13 connected to driving gear 11, while transmitting portion 3 has an odd number of following gear 14 connected to driving gear 11. Thus, following gear 13 of transmitting portion 2 rotates in the same direction as that of driving gear 11, while following gear 14 of transmitting portion 3 rotates in the opposite direction as that of driving gear 11.

The driving gear 11 and the following gears 12, 13, 14 are installed in a gear housing 15 which can swing around the axis of the driving gear 11 within a predetermined stroke, as shown in FIG. 3 and FIG. 4.

According to the swinging direction of gear housing 15, one of the following gears 13, 14 is connected to the steering shaft 102 at each end of its swinging stroke, and thus, the steering shaft 102 is driven to rotate in a normal or a reverse direction.

A projected portion 16 is formed integrally with the gear housing 15, and two solenoids 17, 18 are installed at each end of the swinging stroke of the projected portion 16. The switching means 6 apply an electrical current to one of these two solenoids 17, 18, corresponding to the steering direction of the steering wheel. Thus, the projected portion 16 and the gear housing 15 swing towards one of the solenoids 17, 18.

As a result, according to the steering direction of the steering wheel, one of the following gears 13, 14 is coupled to the steering shaft 102, and the steering shaft 102 is driven to rotate in a normal or a reverse direction.

An elastic member 19 is preferably installed between the projected portion 16 and the body. This elastic member 19 makes the gear housing 15 maintain its neutral position (the position shown in FIG. 2) when the steering wheel does not rotate.

The above described transmitting means and the coupling means can make the steering motor rotate in one direction all the time, regardless of the steering direction, and all the problems concerned with the inertia rotation of the steering motor, such as a delay in steering response time, can be solved.

Figure 5:
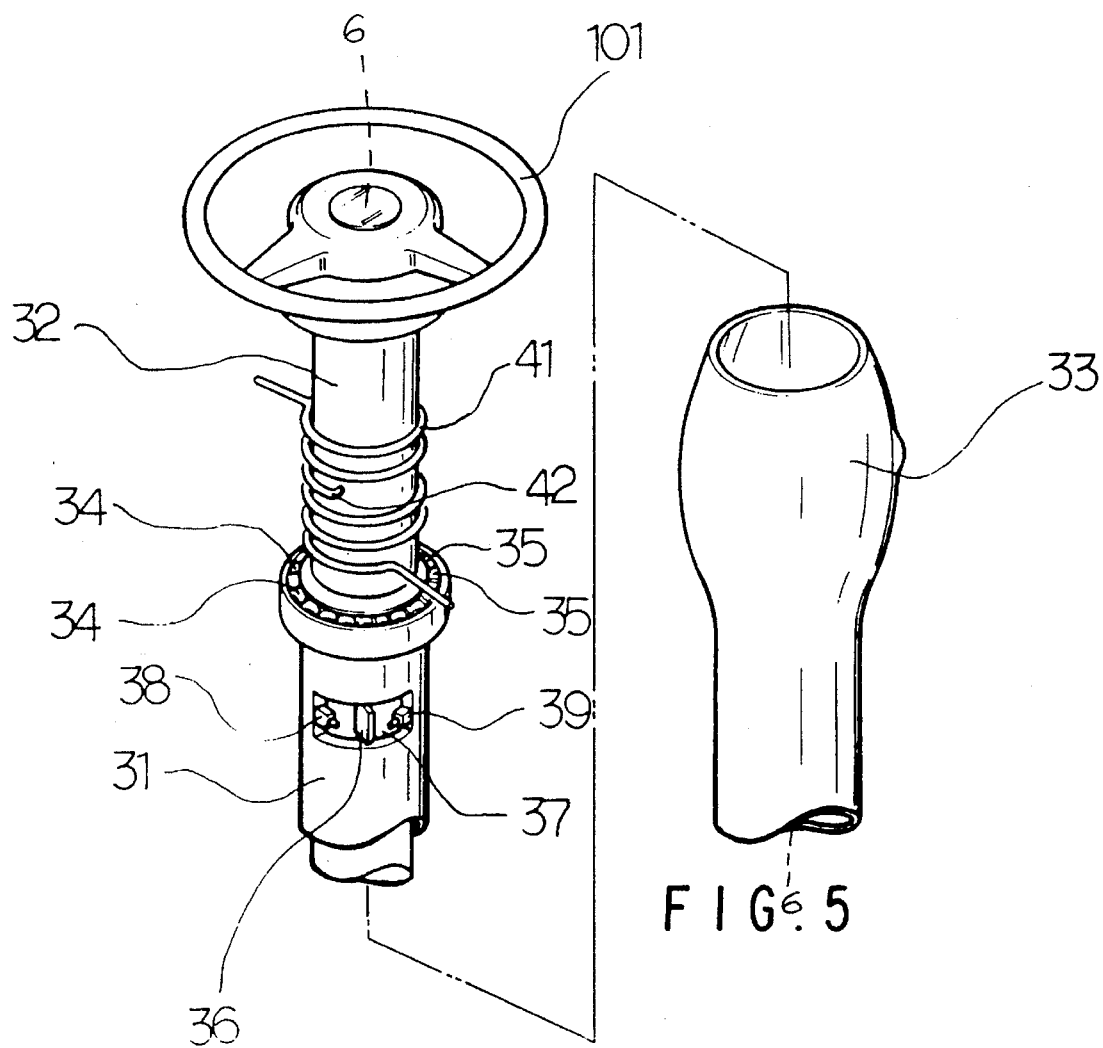
FIG. 5 is a perspective view illustrating an embodiment of the switching means according to the present invention.

FIG. 5 to FIG. 7 show one embodiment of the switching means according to the present invention, in which FIG. 5 is a perspective view, FIG. 6 is a longitudinally sectioned view taken on line along line 6—6 of FIG. 5, and FIG. 7 is a sectioned view taken on line 7—7 of FIG. 6.

In this embodiment, a hollow cylindrical outer shaft 31 is rotatably disposed in a shaft housing 33, and a cylindrical inner shaft 32 is rotatably disposed in the outer shaft 31. The inner shaft 32 is connected to a steering wheel 101 at the upper end, and the outer shaft 31 is connected to a steering link(not shown) at the lower end. The inner shaft 32 has a projected portion 36, and the outer shaft 31 has an opening 37 for guiding the projected portion 36 to move therealong. Thus, the moving stroke of the inner shaft 32 is restricted within the length of the opening 37.

Two switches 38, 39 are installed on each end of the opening 37 so that the projected portion 36 can contact with one of these two switches 38, 39 when moving. The switches 38, 39 have identical construction, and either of them drives the steering motor(not shown) to rotate in one direction, when contacted by the projected portion 36. Also, when one of these two switches 38, 39 is contacted by the projected portion 36, corresponding to the steering direction of the steering wheel, the contacted switch 38 or 39 applies an electrical current to one of the two solenoids 17, 18, and thus, one of the following gear 13, 14 is coupled to the steering shaft 102. As a result, the steering shaft 102 can be rotate in the direction corresponding to the steering direction of the steering wheel.

An elastic member 40 is installed between the outer and the inner shaft 31, 32 so that the inner shaft 32 can stay at and return to the initial position "P1" which has about equal distance from each of those two switches 38, 39.

Reference Numbers 34, 34', 35, 35' indicate bearings.

In accordance with another feature of the present invention, a torsion coil spring 41 is provided. This torsion coil spring 41 winds around the upper portion of the inner shaft 32, piercing through a hole 42 of the inner steering shaft 32. The upper and lower end of the torsion coil spring 41 is fixed to the shaft housing 33. Therefore, when the steering wheel 101 and the inner steering shaft 32 is rotating, the torsion coil spring 41 accumulates torsional stress corresponding to the rotated angle.

Consequently, when the steering wheel 101 is released, the projected protion 36 continues to move toward the other one of the switches 38, 39, and the steering wheel 101 returns to the straight direction, until no more torsional stress remains.

Especially, it is apparently anticipated that this restoring movement takes place even when the car is standing completely still, to say nothing of the state when the car is just completing a corner turning.

Figure 8:
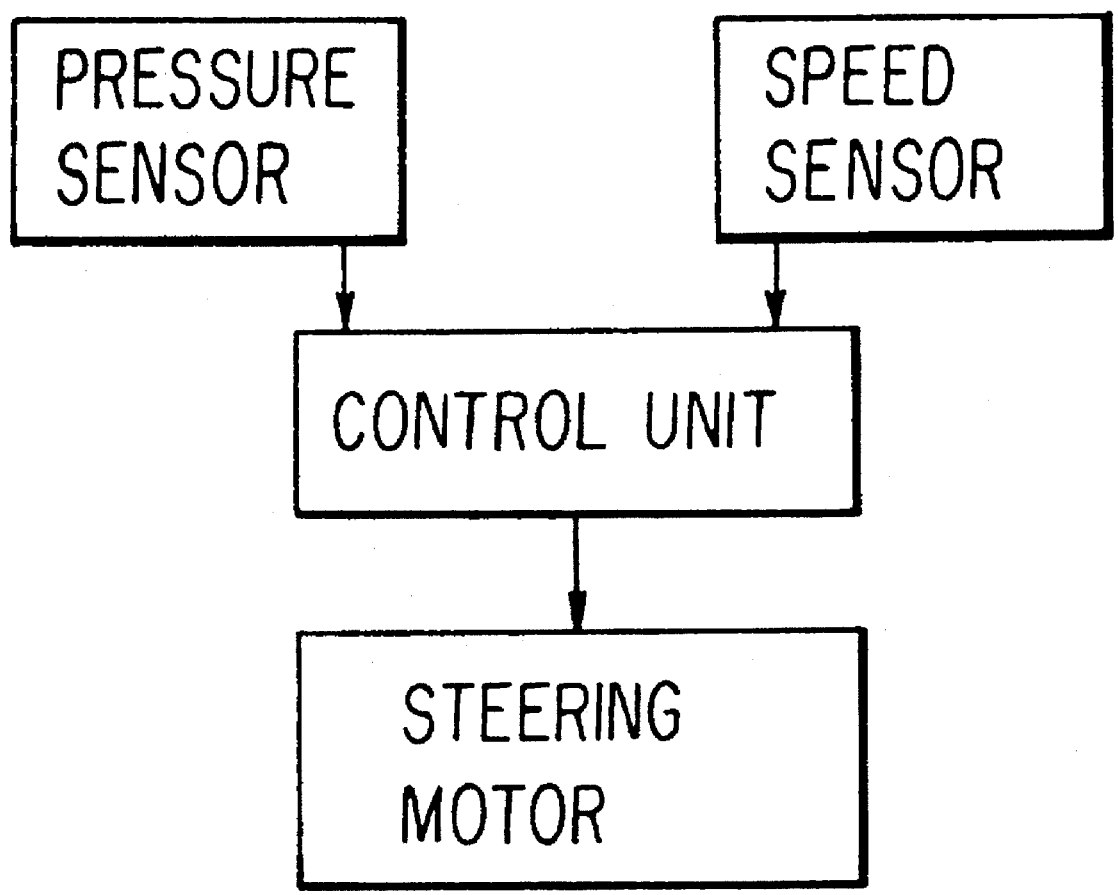
FIG. 8 is a block diagram showing an example of a circuit with a function to make the steering properly responsive in proportion to the running speed of a car.

FIG. 8 is a block diagram which shows an example of a circuit which functions so as to make the steering properly heavy in proportion to the running speed of a car. This circuit has two pressure sensors installed at each of the two switches 38, 39 and detecting the pressure applied to the two switches 38, 39, a speed sensor detecting the running speed of a car, and a control trait applying the driving signal to the steering motor only when the pressure value detected at one of the two pressure sensors exceeds an effective pressure value determined by the current running speed detected at the speed sensor.

The effective pressure value increases in proportion to the running speed of a car. Therefore, the faster the car runs, the more power is required to steer. That is, the steering becomes properly heavy as the speed of the car increases, thereby acquiring enhanced safety.

Various changes and modifications may be made within the scope of the inventive concept.

What is claimed is:

1. An electrical power steering device including a steering wheel connected to one end of a steering shaft and a steering link connected to the other end of said steering shaft, the device comprising:

a steering motor;

transmitting means having first and second transmitting portions rotating in opposite directions by said steering motor, said transmitting means having a driving gear connected to said steering motor, said first transmitting portion having an even number of following gears connected to said driving gear and said second transmitting portion having an odd number of following gears connected to said driving gear, and a gear housing rotatably accommodating said driving gear and said following gears;

coupling means which couple one of the first and second transmitting portions to at least one of said steering shaft and said steering link; and switching means applying a driving signal to said steering motor when said steering wheel rotates and applying a selective coupling signal to said coupling means corresponding to a steering direction of said steering wheel.

2. The electrical power steering device of claim 1, wherein said gear housing is swingable around the axis of said driving gear through a predetermined swing stroke.

3. The electrical power steering device of claim 2, wherein said device is mounted on a body frame of a vehicle and said coupling means comprises:

a projected portion integrally formed with said gear housing;

a first and second solenoid respectively installed at each end of the swinging stroke of said projected portion, said projected portion and said gear housing swinging towards one of said first and second solenoids when said coupling signal is applied by said switching means; and an elastic member installed between said projected portion and said body frame, said elastic member making said projected portion and said gear housing maintain a position in which said projected portion is out of contact with each of said first and second solenoids.

4. The electrical power steering device of claim 1, wherein, said steering shaft comprises;

a hollow cylindrical outer shaft rotatably disposed in a shaft housing, the lower end of the shaft being connected to said steering link, a cylindrical inner shaft rotatably disposed in said outer shaft, and said switching means comprises;

a projected portion formed on said inner shaft, and moving along an opening formed on said outer shaft, the moving stroke of said projected portion being restricted within a length dimension of said opening; and a first and second switch installed, respectively, at opposite ends of said opening, said first and said second switch applying driving signals to said steering motor and a selective coupling signal to one of a first and second solenoid corresponding to the steering direction of said steering wheel, when contacted by said projected portion.

5. The electrical power steering device of claim 4, which comprises:

an elastic member, a first end of which is fixed to said inner shaft and a second end of which is fixed to said outer shaft, thereby making said projected portion stay at and return to a position which is substantially equidistant from each of said first and second switches.

6. The electrical power steering device of claim 4, which comprises:

a torsion coil spring wound around said inner shaft, a middle portion of said torsion coil spring being fixed to said inner shaft and upper and lower portions of said torsion coil spring being fixed to said shaft housing so as to return said steering wheel to a straight direction when steering movement is completed.

7. The electrical power steering device of claim 4, which comprises:

a pressure sensor installed, respectively, at said first and second switches and detecting the pressure applied to said first and second switches, a speed sensor detecting the running speed of a car on which the power steering device is positioned, and a control unit applying a driving signal to said steering motor only when the pressure detected at said pressure sensors exceeds an effective pressure determined by a current running speed of the car detected by said speed sensor, wherein said effective pressure is proportional to the running speed of the car.

8. An electrical power steering device including a steering wheel connected to one end of a steering shaft and a steering link connected to the other end of said steering shaft, the device comprising:

a steering motor;

a transmitting member having first and second transmitting portions rotating in opposite directions by said steering motor, said transmitting member having a driving gear connected to said steering motor, said first transmitting portion having an even number of following gears connected to said driving gear and said second transmitting portion having an odd number of following gears connected to said driving gear, and a gear housing rotatably accommodating said driving gear and said following gears;

a coupling which couples one of the first and second transmitting portions to at least one of said steering shaft and said steering link; and a switch applying a driving signal to said steering motor when said steering wheel rotates and applying a selective coupling signal to said coupling corresponding to a steering direction of said steering wheel.

9. The electrical power steering device of claim 8, wherein said gear housing is swingable around the axis of said driving gear through a predetermined swing stroke.

10. The electrical power steering device of claim 9, wherein said device is mounted on a body frame of a vehicle and said coupling comprises:

a projected portion integrally formed with said gear housing;

a first and second solenoid respectively installed at each end of the swinging stroke of said projected portion, said projected portion and said gear housing swinging towards one of said first and second solenoids when said coupling signal is applied by said switch; and an elastic member installed between said projected portion and said body frame, said elastic member making said projected portion and said gear housing maintain a position in which said projected portion is out of contact with each of said first and second solenoids.

11. The electrical power steering device of claim 8, wherein said steering shaft comprises:

a hollow cylinder outer shaft rotatably disposed in a shaft housing, the lower end of the shaft being connected to said steering link and a cylindrical inner shaft rotatably disposed in said outer shaft, wherein said switch comprises a projected portion formed on said inner shaft and moving along an opening formed on said outer shaft, the moving stroke of said projected portion being restricted within a length dimension of said opening, and a first and second switch installed, respectively, at each end of said opening, said first and second switch applying driving signals to said steering motor and a selective coupling signal to one of said first and second solenoids corresponding to the steering direction of said steering wheel when contacted by said projected portion.

12. The electrical power steering device of claim 11, which comprises:

an elastic member, a first end of which is fixed to said inner shaft and a second end of which is fixed to said outer shaft, thereby making said projected portion stay at and return to a position which is substantially equidistant from each of said first and second switches.

13. The electrical power steering device of claim 11, which comprises:

a torsion coil spring wound around said inner shaft, a metal portion of said torsion coil spring being fixed to said inner shaft and the upper and lower portions of said torsion coil spring being fixed to said shaft housing so as to return said steering wheel to a straight direction when steering movement is completed.

14. The electrical power steering device of claim 11, which comprises:

a first and second pressure sensor installed, respectively, at said first and second switches and detecting the pressure applied to said first and second switches, a speed sensor detecting the running speed of a car on which the power steering device is positioned, and a control unit applying a driving signal to said steering motor only when the pressure detected at said pressure sensor exceeds an effective pressure determined by current running speed of the car detected by said speed sensor, wherein said effective pressure is proportional to the running speed of the car.

* * * * *

UNITED STATES PATENT AND TRADEMARK OFFICE
CERTIFICATE OF CORRECTION

PATENT NO. : 5,503,240
DATED : April 2, 1996
INVENTOR(S) : Soon-Young HONG

It is certified that error appears in the above-indentified patent and that said Letters Patent is hereby corrected as shown below:

On the title page, the Attorney information was missing from the Letters Patent. The included information should read:

--Attorney, Agent, or Firm: Oblon, Spivak, McClelland, Maier, & Neustadt--

Signed and Sealed this

Thirtieth Day of July, 1996

Attest:

BRUCE LEHMAN

*Attesting Officer*   *Commissioner of Patents and Trademarks*